US009843461B2

(12) United States Patent
Travostino

(10) Patent No.: US 9,843,461 B2
(45) Date of Patent: Dec. 12, 2017

(54) SYSTEM AND METHOD FOR PROVIDING VALUE-ADDED CONTENT IN AN ELECTRONIC COMMUNICATIONS ENVIRONMENT

(75) Inventor: Franco Travostino, San Jose, CA (US)

(73) Assignee: eBay Inc., San Jose, CA (US)

( * ) Notice: Subject to any disclaimer, the term of this patent is extended or adjusted under 35 U.S.C. 154(b) by 1365 days.

(21) Appl. No.: 12/263,375

(22) Filed: Oct. 31, 2008

(65) Prior Publication Data

US 2010/0114656 A1 May 6, 2010

(51) Int. Cl.
*G06Q 30/06* (2012.01)
*G06Q 30/04* (2012.01)
*G06Q 30/02* (2012.01)
*H04L 12/64* (2006.01)
*G06Q 40/00* (2012.01)

(52) U.S. Cl.
CPC ......... *H04L 12/6418* (2013.01); *G06Q 30/04* (2013.01); *G06Q 30/06* (2013.01); *G06Q 40/00* (2013.01)

(58) Field of Classification Search
CPC ........ G06F 17/30; G06Q 30/02; G06Q 20/12; G06Q 30/06; G06Q 50/01; G06Q 30/0222
USPC .................................................... 705/26, 35
See application file for complete search history.

(56) References Cited

U.S. PATENT DOCUMENTS

| 2002/0111873 A1* | 8/2002 | Ehrlich et al. ................... 705/26 |
| 2002/0156685 A1* | 10/2002 | Ehrlich et al. ................... 705/26 |
| 2008/0082480 A1* | 4/2008 | Gounares et al. ................ 707/2 |
| 2009/0157508 A1* | 6/2009 | Illingworth et al. ............ 705/14 |

OTHER PUBLICATIONS

Google Video screen shot.*

* cited by examiner

*Primary Examiner* — Hao Fu
(74) *Attorney, Agent, or Firm* — Schwegman Lundberg & Woessner, P.A.

(57) ABSTRACT

In various exemplary embodiments, a system architecture and associated method to provide value-added content in an electronic communications environment occurring over a communications link between a first electronic system provider and a third-party cloud provider is disclosed. The system architecture comprises an electronic communications interface to allow translation between the first electronic system provider, additional electronic system providers, and an end-user to the third-party cloud provider. The electronic communications interface further provides the first electronic system provider with at least a portion of the content within communications streams from the additional electronic system providers and the end-user via the communications link. A visual generator provides display regions to the end-user with the value-added content from the first electronic system provider that is related to the at least a portion of the content of at least one of the communications streams.

21 Claims, 5 Drawing Sheets

SYSTEM AND METHOD FOR PROVIDING VALUE-ADDED CONTENT IN AN ELECTRONIC COMMUNICATIONS ENVIRONMENT

CROSS-REFERENCE TO RELATED APPLICATIONS

This application claims priority benefit of U.S. Provisional Application No. 61/095,268, entitled, "Integration of a Cloud Infrastructure into Existing Services," filed Sep. 8, 2008, which is hereby incorporated by reference in its entirety.

TECHNICAL FIELD

The present application relates generally to the field of computer technology and, in a specific exemplary embodiment, to a system and method of providing value-added content to an end-user in an Internet-based commerce environment.

BACKGROUND

During the past several years, a substantial growth has occurred in the quantity and diversity of information and services available over the Internet. The number of users of the Internet has similarly grown rapidly. A predominant growth area on the Internet has been in the use of the World Wide Web, often referred to as WWW, W3, or simply "the Web." The hyper-text transfer protocol (HTTP) that serves as a foundation protocol for the Web has been widely adopted and implemented in numerous Web browsers and Web servers.

Web browsers provide a convenient user application for receiving textual and graphical information of individual Web pages in a scrollable display page format. The Web pages allow a typical end-user to access a variety of commercial and retail Web sites.

However, as commercial and retail sites continue to proliferate on the Web, the quantity of content on the Web increases commensurately. From a convenience standpoint, the typical end-user would prefer a means to more fully and easily integrate content available on a given subject, such as a product, into a single Web page.

BRIEF DESCRIPTION OF DRAWINGS

Various ones of the appended drawings merely illustrate exemplary embodiments of the present invention and should not be considered as limiting its scope.

DETAILED DESCRIPTION

Figure 1A:
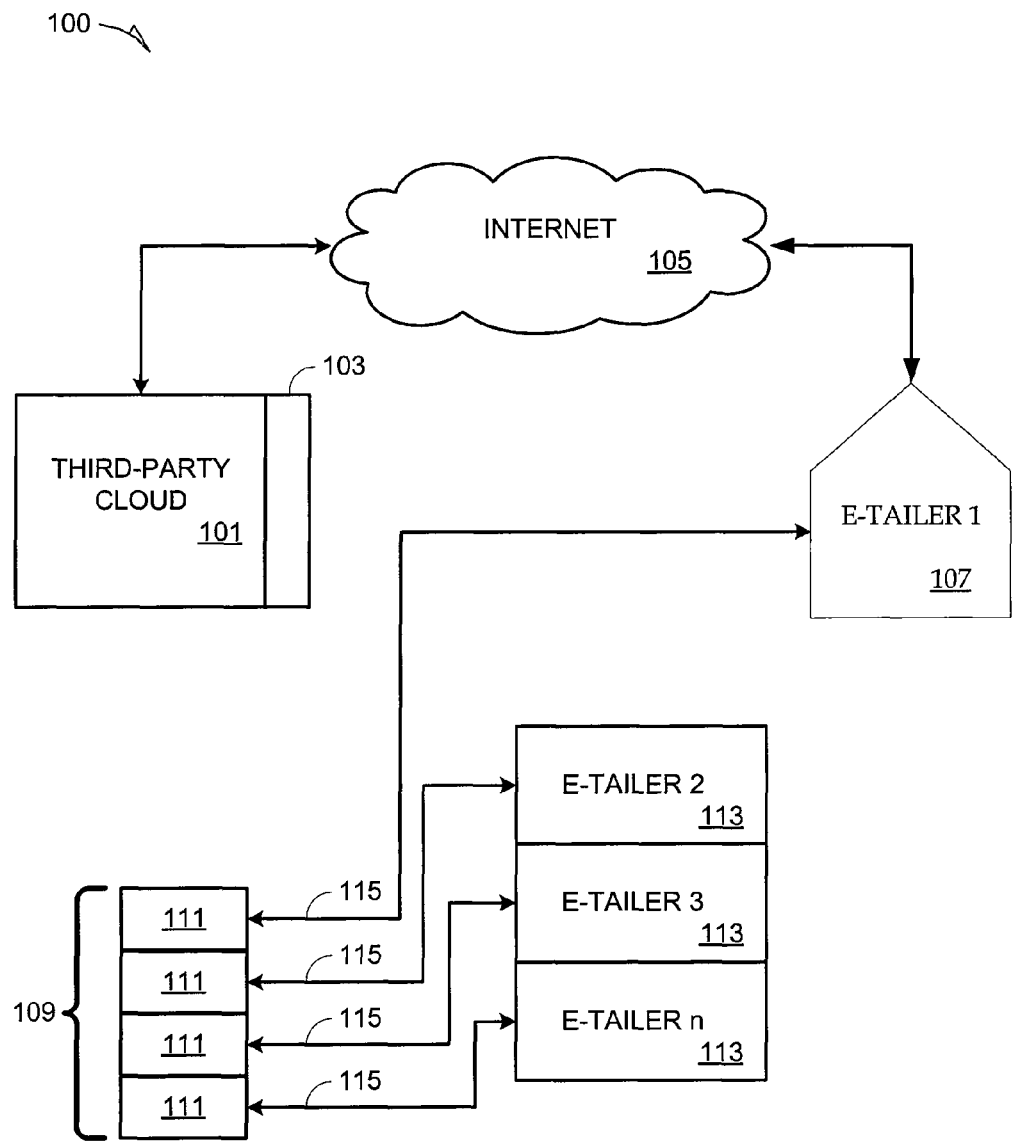
FIG. 1A depicts an exemplary schematic diagram of an Internet-based electronic retailing community.

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. Further, well-known instruction instances, protocols, structures, and techniques have not been shown in detail.

As used herein, the term "or" may be construed in an inclusive or exclusive sense. Similarly, the term "exemplary" may be construed merely to mean an example of something or an exemplar and not necessarily a preferred means of accomplishing a goal. Additionally, although various exemplary embodiments discussed below focus on an electronic retail environment, the embodiments are merely given for clarity in disclosure. Thus, any type of electronic commerce or electronic communications system and method, including an accompanying overall system architecture for use in communications and commerce, is considered as being within the scope of the present invention.

In an exemplary embodiment, a system architecture to provide value-added content in an electronic communications environment occurring over a communications link between a first electronic system provider and a third-party cloud provider is disclosed. The system architecture comprises an electronic communications interface to allow translation between the first electronic system provider, additional electronic system providers, and an end-user to the third-party cloud provider. The electronic communications interface further provides the first electronic system provider with at least a portion of the content within communications streams from the additional electronic system providers and the end-user via the communications link. A visual generator provides display regions to the end-user with the value-added content from the first electronic system provider that is related to the at least a portion of the content of at least one of the communications streams.

In another exemplary embodiment, a method to provide value-added content from a first electronic system provider in an electronic communications environment is disclosed. The method comprises intercepting at least a portion of communications between a third-party cloud and additional electronic system providers over an electronic communications interface and allowing access to information related to the additional electronic system providers through the first electronic system provider.

In another exemplary embodiment, a processor-readable storage medium storing an instruction that, when executed by a processor, causes the processor to perform a method to provide value-added content from a first electronic system provider in an electronic communications environment is disclosed. The method comprises intercepting at least a portion of communications between a third-party cloud and additional electronic system providers over an electronic communications interface and allowing access to information related to the additional electronic system providers through the first electronic system provider.

In another exemplary embodiment, a system for providing value-added content in an electronic communications environment is disclosed. The system comprises a communications means for providing electronic communications between a first electronic system provider and a third-party cloud provider, an electronic communications interfacing means for allowing translation between the first electronic system provider, additional electronic system providers, and an end-user to the third-party cloud provider. The electronic communications interface means further provides the first electronic system provider with at least a portion of the content of communications streams from the additional electronic system providers and the end-user via the communications means. A visual generating means for generating to the end-user a plurality of display regions provides the value-added content from the first electronic system provider that is related to the at least a portion of the content of the communications streams.

Each of these exemplary embodiments, and others, is discussed in detail, below.

With reference to FIG. 1A, an electronic retailing (or commerce) environment 100 includes a third-party cloud 101, a business interface 103 coupled to the third-party cloud 101, and a first electronic retailer ("e-tailer") 107 in communication with the third-party cloud 101 through the Internet 105. Additionally, an end-user 109 is in a plurality of communication sessions 111 with both the first electronic retailer 107 and a plurality of additional electronic retailers 113. The first electronic retailer 107 and the plurality of additional electronic retailers 113 may also be considered to include any type of electronic commerce or electronic communications providers such as Internet-based auction sites, wholesale sales sites, business-to-business sites, banking sites, and stock and other investment sites. Thus, the first electronic retailer may be any type of electronic system provider.

Each of the plurality of communication sessions 111 takes place with the first electronic retailer 107 and the plurality of additional electronic retailers 113 through a plurality of communications links 115. The plurality of communications links 115 may take place over the Internet 105 or through various other types of networks (not shown). Additionally, one or more of the plurality of additional electronic retailers 113 may be in direct communication with the first electronic retailer 107 (not shown but readily understandable by one of skill in the art).

The third-party cloud 101 is a type of infrastructure known by one skilled in the art. Cloud computing, in general, is a computing paradigm in which tasks are assigned to a combination of connections, software, or services accessed over a network. This network of connections, software, and services is collectively known as a "cloud." Currently, the software and services for use in a "cloud" network are especially built or configured to be included in the cloud and, as a result, such specialized software and services cannot operate outside of the cloud.

Typically, in cloud computing, a third-party offers an allocation of hardware and software resources based on particular needs. The hardware and software resources are coupled to the Internet 105 and become part of the cloud. In cloud computing, an allocation of resources is dynamic and the resources are allocated as needed. In contrast, hosted computing requires a static allocation of resources with advance notification required along with an anticipated usage level.

Outside users will typically interface with the third-party cloud 101 through the business interface 103. The business interface 103 provides parameters of a service level agreement (SLA) that establish factors such as quality of service (QOS), reliability, and peak demand scheduling between the third-party cloud 101 and external users.

In general, the first electronic retailer 107 could be, for example, an electronic commerce channel such as eBay.com. Similarly, the plurality of additional electronic retailers 113 could be comprised of other commerce-based channels including, for example, Overstock.com, Amazon.com, and BHphoto.com. The end-user 109 could be comparing prices on Overstock.com and BHphoto.com with similar items sold on eBay.com. Further, the end-user 109 could make a purchase on Amazon.com and use PayPal.com (a division of eBay.com) to pay for the purchase. Thus, the end-user 109 is able to compare prices for products, find additional information such as product information, pay for purchases, and in general receive a host of additional value-added content.

Figure 1B:
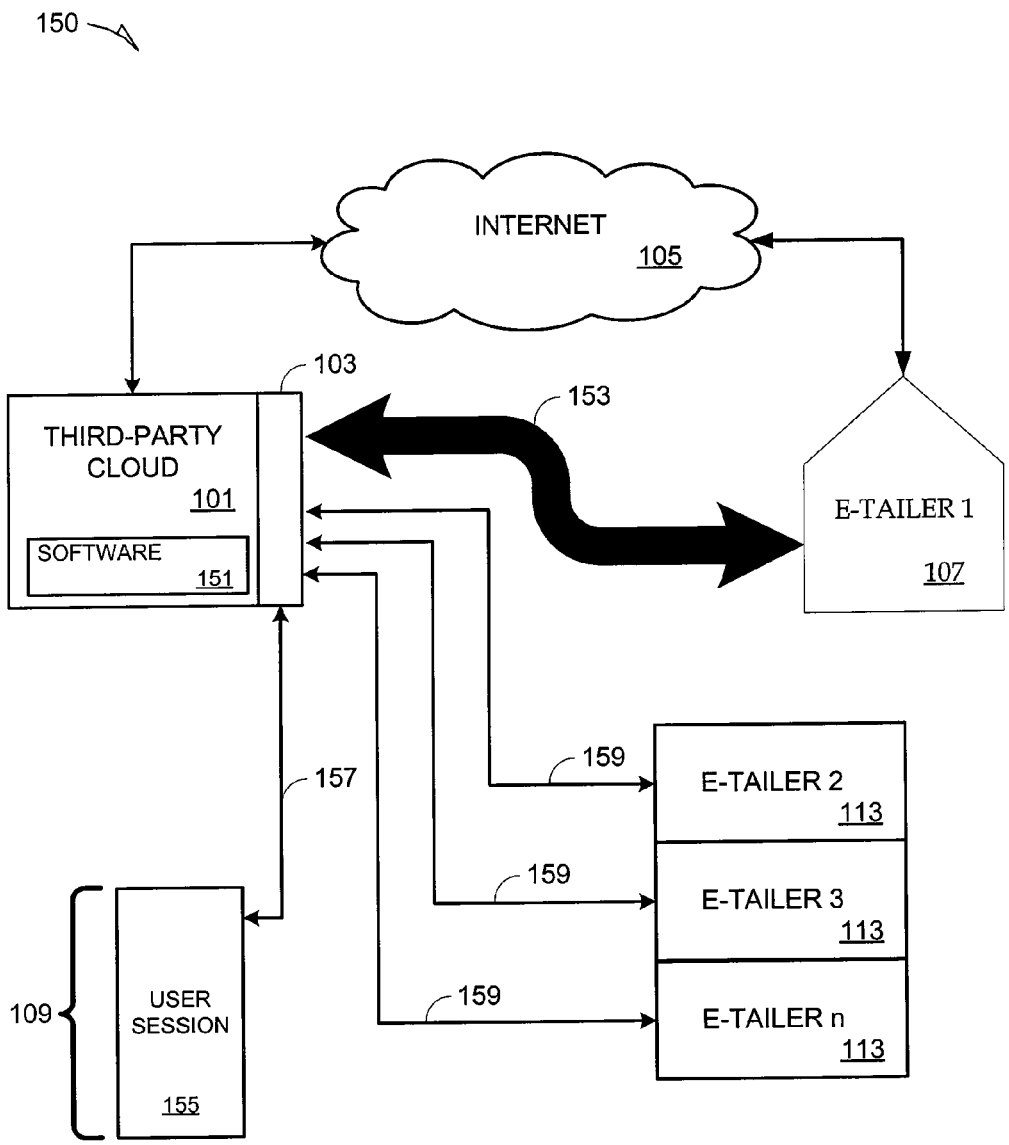
FIG. 1B depicts an exemplary schematic diagram of an Internet-based electronic retailing community with value-added content provided directly to an end-user, in accordance with various embodiments described herein.

Referring now to FIG. 1B, an enhanced electronic retailing environment 150 includes electronic commerce software 151 placed within the third-party cloud 101 and an enhanced communications link 153 between the first electronic retailer 107 and the business interface 103 of the third-party cloud 101. Additionally, the end-user 109 now has a single user session 155 coupled to the business interface 103 of the third-party cloud 101 through a communications link 157. Each of the plurality of additional electronic retailers 113 is also coupled to the business interface 103 of the third-party cloud 101 through a plurality of communications links 159.

The enhanced communications link 153 may be any type of link known in the industry including, for example, a hardwired network connection, an optical fiber connection, a T1 line, and so on. The enhanced communications link 153 is sized appropriately to provide a proper quality of service between the third-party cloud 101, the end-user 109, and each of the plurality of additional electronic retailers 113. Further, the electronic commerce software 151, combined with the enhanced communications link 153, allows the first electronic retailer 107 to perceive interactions (e.g., through a plurality of communications streams) between the end-user 109 and the plurality of additional electronic retailers 113. Perceiving the interactions allows the first electronic retailer 107 to provide the end-user 109 with inventory features of the product, trust and safety features, auction features, payment features, price information comparisons, and a range of other features. Additionally, user preferences for products and information sought from the plurality of additional electronic retailers 113 and communicated through the plurality of communications streams may be provided to the first electronic retailer 107 for marketing research studies.

In a specific exemplary embodiment, the end-user 109 may access the single user session 155 coupled to the business interface 103 of the third-party cloud 101 through a communications link 157 over a visual generator (not shown but readily understood by one of skill in the art upon reading the disclosure contained herein). The visual generator may be comprised of a visual rendering portion (i.e., a front-end portion on a computer of the end-user 109) and a back-end agent portion located within the third-party cloud 101, described in more detail with reference to FIG. 2, below.

The electronic commerce software 151 is described in more detail below with reference to FIG. 2. However, the electronic commerce software 151 functions along with the business interface 103 and provides an electronic interface that is essentially an open solution providing enhanced communications, or translation, for the end-user 109 between the first electronic retailer 107 and the plurality of additional electronic retailers 113. Thus, convenience in comparing price information, product information, availability information, and a host of other value-added content is more readily accessible by the end-user 109 through the single user session 155. The term "electronic commerce software 151" is chosen merely to enhance clarity of disclosure of the present invention. Thus, the electronic commerce software 151 may actually be embodied by firmware or hardware configured to achieve results similar to those disclosed herein by software and, therefore, may be considered to be, along with the business interface 103, an electronic communications interface.

Although specifics of the single user session 155 are not defined herein, based on this disclosure a skilled artisan can readily envision how the end-user 109 searching for a product through a Web browser on, for example, Overstock.com will automatically open a number of sub-windows for each electronic retailer as needed, with each having a separate interface link. The single user session may thus be considered to be a visual interface to generate a plurality of display regions providing the value-added content to the end-user. The separate interface links may provide direct links in the sub-windows or display regions to eBay.com, Amazon.com, and other electronic retailers having information about the product. The end-user 109 may pay a premium service fee in trade for the convenience of the enhanced electronic retailing environment 150. Consequently, the enhanced electronic retailing environment 150 provides convenience for the end-user 109 while providing a profit to at least one of the electronic retailers 107, 113 for the value-added content provided from the multi-channeling.

Although the electronic commerce software 151 is shown located within the third-party cloud 101, the electronic commerce software 151 could be running in a server (not shown) located within any of the electronic retailer environments. However, by placing the electronic commerce software 151 within the third-party cloud 101, the end-user 109 is ensured of a neutral and bias-free retail or commerce environment.

Figure 2:
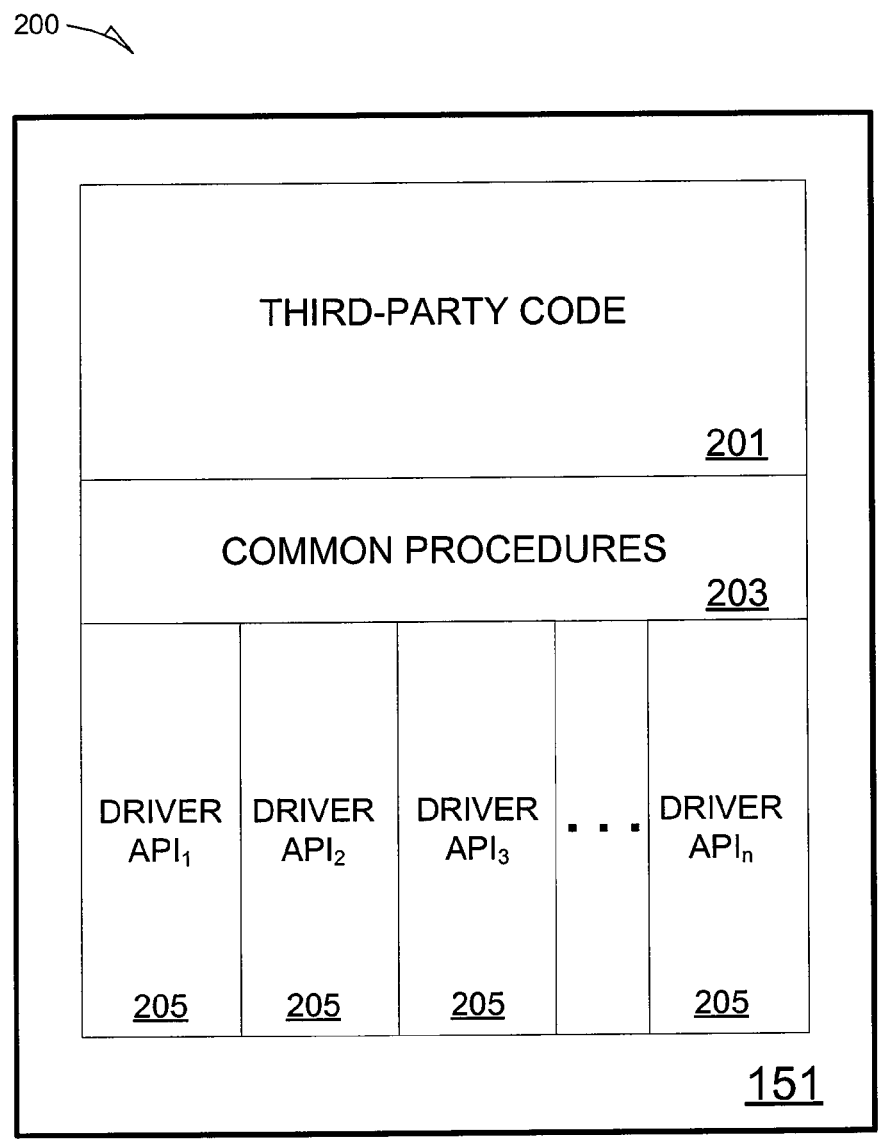
FIG. 2 depicts a block diagram of exemplary software placed in a third-party cloud and configured to interface with a plurality of external electronic retailers.

With reference now to FIG. 2, a detailed exemplary embodiment 200 of the electronic commerce software 151 of FIG. 1B includes a third-party code section 201, a common procedures section 203, and a plurality of application program interface (API) driver sections 205. The third-party code section 201 includes any software components, algorithms, etc., necessary to work with the third-party cloud 101. Thus, details of the third-party code section 201 will vary from one cloud provider to another. However, details for interfacing any cloud provider with software in general, and the electronic commerce software 151 in particular, is known independently by one skilled in the art. Further, the third-party code section 201 may be considered an open solution and is thus directly open to extension by the third-party cloud provider.

Additionally, the common procedures section 203 provides an interface from each of the plurality of API driver sections 205. The common procedures section 203 may be considered as a software development kit (SDK) interface. SDKs are known independently in the art and allow a programmer to create applications for enhancing operation of other software. Here, operation of each API driver in the plurality of API driver sections 205 is enhanced through the common procedures section 203 to operate with the third-party code section 201 and, consequently, with the third-party cloud 101 (FIGS. 1A and 1B). Details for the common procedures section 203 will vary depending upon details required by a cloud provider and a particular API interfacing with the cloud provider. However, the skills required to write code within the common procedures section 203 are known independently in the art.

Each of the API drivers within the plurality of API driver sections 205 is directly obtainable from a particular one of the plurality of additional electronic retailers 113. For example, the API driver (e.g., $API_1$) associated with the first electronic retailer 107 is available directly from the first electronic retailer. Additionally, since the first electronic retailer 107 is effectively acting as a host for the enhanced services provided to the end-user 109, $API_1$ will likely contain additional code to provide the enhanced services. The additional code may be, for example, routines to poll input and output streams from the remainder of the APIs, routines to poll input and output streams from the end-user 109, and code to record such information.

Figure 3:
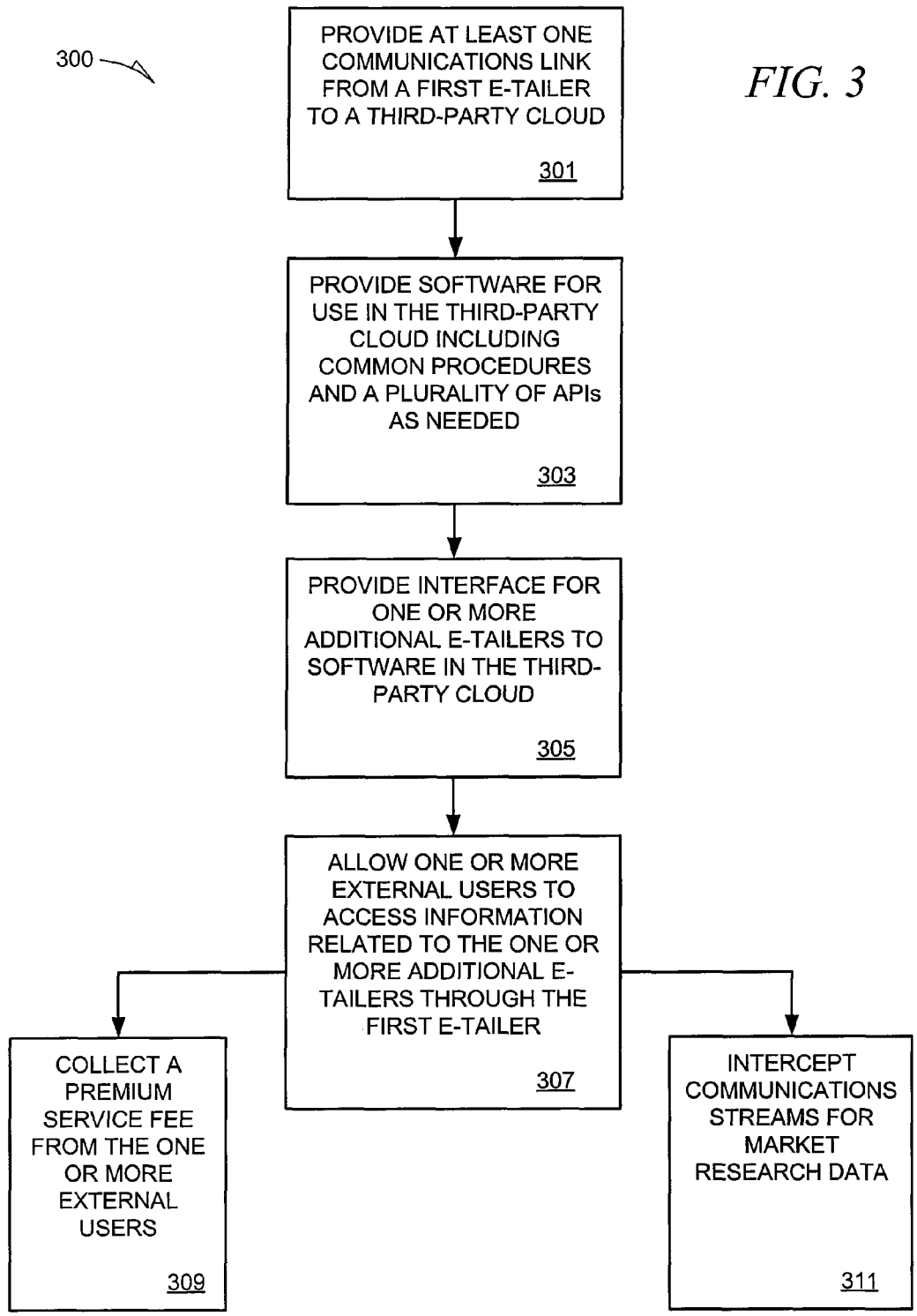
FIG. 3 depicts a flow diagram of a general overview of an exemplary method, in accordance with various exemplary embodiments, for providing value-added content to an external user by establishing communications between the user and a plurality of electronic retailers through a third-party cloud.

With reference now to FIG. 3 and continued reference to FIG. 1B, a flowchart 300 provides an overview of an exemplary method for establishing the enhanced electronic retailing environment 150 (FIG. 1B). At least one communications link is provided (301) from a first electronic retailer to a third-party cloud. Software is provided (303) for use in a third-party cloud. The software includes common procedures, possibly in the form of an SDK interface, and a plurality of APIs as needed. Each of the APIs, as noted above, may be obtained from each of the electronic retailers. An interface is provided (305) in the software to a business interface of the third-party cloud for one or more additional electronic retailers. One or more external users are allowed (307) to access information related to the one or more additional electronic retailers with enhanced services provided through the first electronic retailer.

With continuing reference to FIG. 3, the first electronic retailer may optionally collect a premium service fee (309) from the one or more external users. Although as noted above, the one or more external users may simply open a plurality of communication sessions 111 (FIG. 1A), various embodiments of the present invention disclosed herein provide a convenience factor for which the one or more external users may be willing to pay the premium service fee. Additionally, the first electronic retailer may optionally collect streams of data (311) from the one or more external users and the one or more electronic retailers, thus providing information for market research.

With reference again to FIG. 1B, the first electronic retailer 107 may further comprise modules for billing and stream interception (not shown). As noted immediately above with reference to step 309 of FIG. 3, the first electronic retailer 107 may optionally collect a premium service fee from the end-user 109. A billing module implemented in, for example, software or firmware may be configured to provide periodic bills to the end-user 109. Similarly, a stream interception module may be implemented in software or firmware and be configured to collect streams of input and output data flowing through the third-party cloud 101 as well as to and from the end-user 109 and the plurality of additional electronic retailers 113 as noted in step 311, above. The data collected by the stream interception module may be used by the first electronic retailer 107 and conducting market research.

While various embodiments of the present invention are described with reference to assorted implementations and exploitations, it will be understood that these embodiments are illustrative only and that a scope of the present inventions are not limited to them. In general, techniques for cloud infrastructure integration may be implemented with facilities consistent with any hardware system or hardware systems defined herein. Many variations, modifications, additions, and improvements are possible.

Plural instances may be provided for resources, operations, or structures described herein as a single instance. Finally, boundaries between various resources, operations, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of the present invention is represented by the appended claims.

Modules, Components, and Logic

Additionally, certain embodiments described herein may be implemented as logic or a number of modules, components, or mechanisms. A module, logic, component, or mechanism (collectively referred to as a "module") may be a tangible unit capable of performing certain operations and is configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by cost and time considerations.

Accordingly, the term module should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Electronic Apparatus and System

Exemplary embodiments may be implemented in analog, digital, or hybrid electronic circuitry, or in computer hardware, firmware, software, or in combinations thereof. Exemplary embodiments may be implemented using a computer program product, for example, a computer program tangibly embodied in an information carrier (e.g., in a machine-readable medium for execution by, or to control the operation of, data processing apparatus, for example, a programmable processor, a computer, or multiple computers).

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

In certain exemplary embodiments, operations may be performed by one or more programmable processors executing a computer program to perform functions by operating on input data and generating output. Method operations can also be performed by, and apparatus of exemplary embodiments may be implemented as, special purpose logic circuitry (e.g., a field programmable gate array (FPGA) or an application-specific integrated circuit (ASIC)).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various exemplary embodiments.

Exemplary Machine Architecture and Machine-Readable Medium

Figure 4:
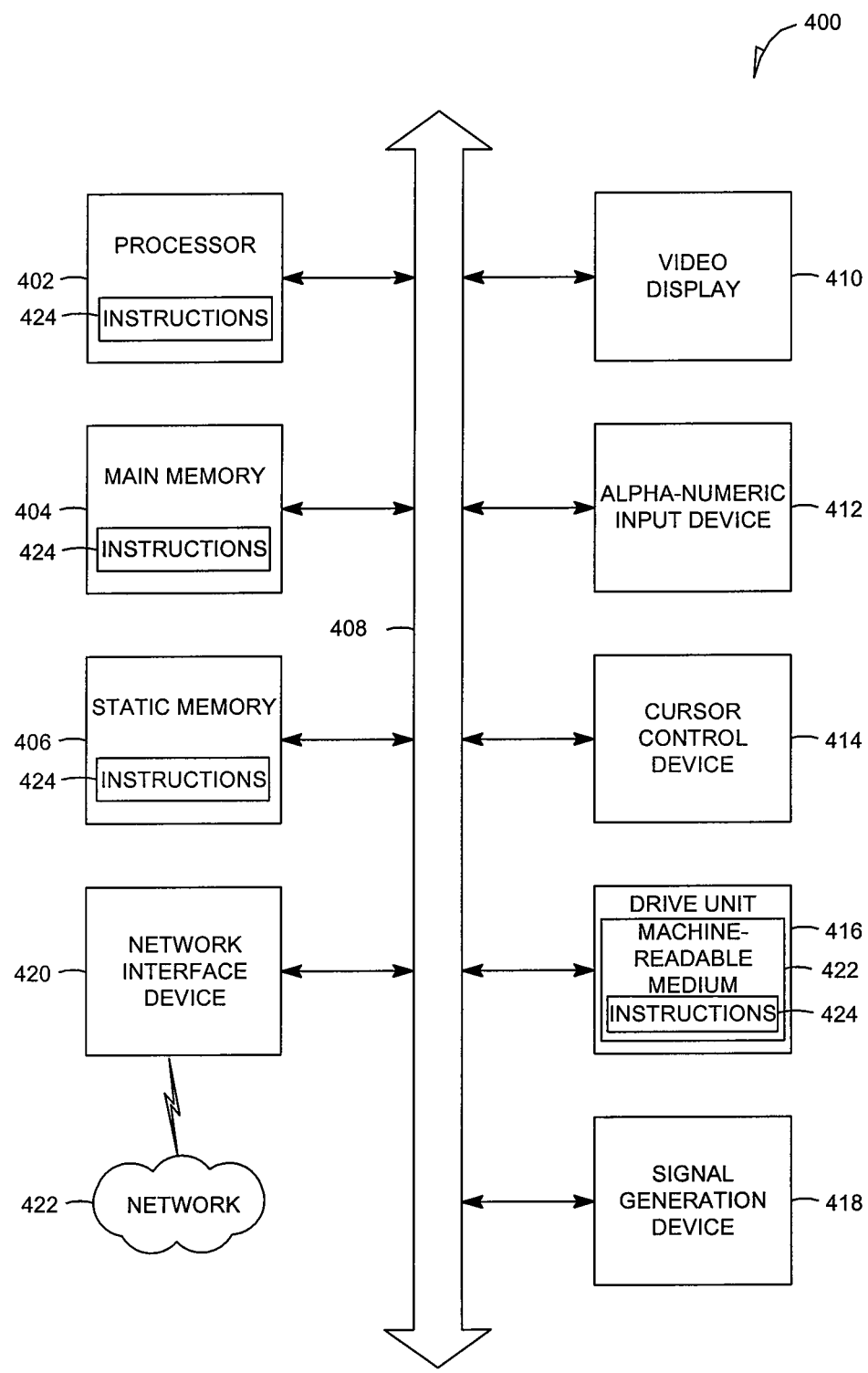
FIG. 4 is a simplified block diagram of a machine in an exemplary form of a computing system within which a set of instructions, for causing the machine to perform any one or more of the methodologies discussed herein, may be executed.

With reference to FIG. 4, an exemplary embodiment extends to a machine in the exemplary form of a computer system 400 within which instructions, for causing the machine to perform any one or more of the methodologies discussed herein, may be executed. In alternative exemplary embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker), and a network interface device 420.

Machine-Readable Medium

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 or within the processor 402 during execution thereof by the computer system 400; the main memory 404 and the processor 402 also constituting machine-readable media.

While the machine-readable medium 422 is shown in an exemplary embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of exemplary semiconductor memory devices (e.g., EPROM, EEPROM, and flash memory devices); magnetic disks such as internal hard disks and removable disks; magneto-optical disks; and CD-ROM and DVD-ROM disks.

Transmission Medium

The software 424 may further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Exemplary Three-Tier Software Architecture

In some embodiments, the described methods may be implemented using a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data input through the interface level. The logic tier may communicate the results of such processing to the interface tier, or to a backend or storage tier. The processing performed by the logic tier may relate to certain rules or processes that govern the software as a whole. A third storage tier may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology or a variety of technologies. The exemplary three-tier architecture, and the technologies through which it is implemented, may be realized on one or more computer systems operating, for example, as a standalone system, or organized in a server-client, peer-to-peer, distributed, or some other suitable configuration. Further, these three tiers may be distributed between more than one computer system as various components.

Components

Exemplary embodiments may include the above described tiers, and processes or operations about constituting these tiers may be implemented as components. Common to many of these components is an ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented or object-oriented programming technique can be implemented using a Visual Component Library (VCL), Component Library for Cross Platform (CLX), JavaBeans (JB), Enterprise JavaBeans™ (EJB), Component Object Model (COM), Distributed Component Object Model (DCOM), or any other suitable technique.

Software for these components may further enable communicative coupling to other components (e.g., via various APIs), and may be compiled into one complete server, client, or peer software application. Further, these APIs may be able to communicate through various distributed programming protocols as distributed computing components.

Distributed Computing Components and Protocols

Some exemplary embodiments may include remote procedure calls being used to implement one or more of the above described components across a distributed programming environment as distributed computing components.

For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques and can be written in the same programming language or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model or Transmission Control Protocol/Internet Protocol (TCP/IP) protocol stack model for defining the protocols used by a network to transmit data.

A System of Transmission between a Server and Client

Exemplary embodiments may use the OSI model or TCP/IP protocol stack model for defining protocols used by a network to transmit data. In applying these models, a system of data transmission between a server and client, or between peer computer systems, may, for example, include five layers comprising: an application layer, a transport layer, a network layer, a data link layer, and a physical layer. In the case of software for instantiating or configuring components having a three-tier architecture, the various tiers (e.g., the interface, logic, and storage tiers) reside on the application layer of the TCP/IP protocol stack. In an exemplary implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data are transmitted over a network such as an internet, LAN, WAN, or some other suitable network. In some cases, Internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology) or structures.

Although an embodiment has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually or collectively, by the term "invention" merely for convenience and without intending to voluntarily limit the scope of this application to any single invention or inventive concept if more than one is, in fact, disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

For example, particular embodiments describe various arrangements, algorithms, programming tools, and topologies of systems. A skilled artisan will recognize, however, that additional embodiments may be focused on electronic business applications and accompanying system architectures in general and not specifically to electronic retailing and commerce.

These and various other embodiments are all within a scope of the present invention. The specification and drawings are, accordingly, to be regarded in an illustrative rather than a restrictive sense.

What is claimed is:

1. A system architecture to provide value-added content in an electronic communications environment occurring over a communications link between a first electronic system provider and a third-party cloud provider, the system architecture comprising:

an electronic communications interface coupled to the third-party cloud provider and having one or more processors, to provide electronic coupling and translation between the first electronic system provider, a plurality of additional electronic system providers, and an end-user that is coupled only to the third-party cloud provider, the end-user being coupled only to the third-party cloud through a communications link, each of the plurality of additional electronic system providers being coupled to the third-party cloud through a plurality of communications links, the electronic communications interface further to provide the first electronic system provider with at least a portion of the content within communications streams from the plurality of additional electronic system providers and the end-user via the communications link through the electronic communications interface, the first electronic system provider having an interception module configured to intercept, through the electronic communications interface, at least a portion of the communications streams between the end-user, the third-party cloud provider, and the plurality of additional electronic system providers; and a visual generator to generate to the end-user a plurality of display regions providing the value-added content from the first electronic system provider that is related to at least a portion of the content of at least one of the communications streams.

2. The system architecture of claim 1, wherein the electronic communications interface comprises:

an application programming interface driver section including at least one application programming interface driver for each of the plurality of additional electronic system providers and the first electronic system provider;
a third-party code section to allow communications between the application programming interface driver section and the third-party cloud provider; and
a common procedures section coupled between the application programming interface driver section in the third-party code section to provide communications between the at least one application programming interface driver for each of the plurality of additional electronic system providers and the third-party code section.

3. The system architecture of claim 1, wherein the electronic communications interface is partially implemented in software and configured to be executed on the one or more processors.

4. The system architecture of claim 1, wherein the electronic communications interface is implemented in hardware.

5. The system architecture of claim 1, wherein the first electronic system provider further comprises a billing module configured to charge a service fee to the end-user for the value-added content.

6. A method to provide value-added content from a first electronic system provider in an electronic communications environment, the method comprising:
providing an interface to a third-party cloud provider between the first electronic system provider, a plurality of additional electronic system providers, and an end-user that is coupled only to the third-party cloud provider;
intercepting, at the first electronic system provider using one or more processors, at least a portion of communications between a third-party cloud and one or more additional electronic system providers over an electronic communications interface, each of the one or more additional electronic system providers being coupled to the third-party cloud through a plurality of communications links; and
allowing access to information related to the one or more additional electronic system providers and the first electronic system provider received by the electronic communications interface and accessible to the end-user through the third-party cloud provider.

7. The method of claim 6 further comprising providing the electronic communications interface to allow communications between the first electronic system provider, the third-party cloud, and the one or more additional electronic system providers.

8. The method of claim 7 further comprising providing additional interfaces between the electronic communications interface and the one or more additional electronic system providers, the electronic communications interface to allow translation of communications between each of the one or more additional electronic system providers in the third-party cloud.

9. The method of claim 7 further comprising placing the electronic communications interface into the third-party cloud.

10. The method of claim 7 further comprising:
providing a plurality of application programming interface drivers within the electronic communications interface, the plurality of application programming interface drivers including at least one driver for each of the one or more additional electronic system providers and the first electronic system provider;
providing a third-party code section within the electronic communications interface to allow communications with the third-party cloud; and
providing a common procedures section within the electronic communications interface to allow communications between each of the plurality of application programming interface drivers and the third-party code section.

11. The method of claim 6 further comprising collecting a premium service fee from each of one or more external users.

12. The method of claim 11 further comprising:
intercepting a first set of communications streams between the one or more additional electronic system providers and the third-party cloud; and
intercepting a second set of communications streams between each of the one or more external users and the third-party cloud.

13. The method of claim 12 further comprising using the first and second sets of intercepted communications streams to provide market research.

14. A processor-readable storage medium having no transitory signals and storing an instruction that, when executed by a processor, causes the processor to perform operations to provide value-added content from a first electronic system provider in an electronic communications environment, the operations comprising:
providing an interface to a third-party cloud provider between the first electronic system provider, a plurality of additional electronic system providers, and an end-user that is coupled only to the third-party cloud provider;
intercepting, at the first electronic system provider using one or more processors, at least a portion of communications between a third-party cloud and one or more additional electronic system providers over an electronic communications interface, each of the one or more additional electronic system providers being coupled to the third-party cloud through a plurality of communications links; and
allowing access to information related to the one or more additional electronic system providers and the first electronic system provider received by the electronic communications interface and accessible to the end-user through the third-party cloud provider.

15. The processor-readable storage medium of claim 14 wherein the method further comprises providing the electronic communications interface to allow communications between the first electronic system provider, the third-party cloud, and the one or more additional electronic system providers.

16. The processor-readable storage medium of claim 15 wherein the method further comprises providing additional interfaces between the electronic communications interface and the one or more additional electronic system providers, the electronic communications interface to allow translation of communications between each of the one or more additional electronic system providers in the third-party cloud.

17. The processor-readable storage medium of claim 15 wherein the method further comprises placing the electronic communications interface into the third-party cloud.

18. The processor-readable storage medium of claim 15 wherein the method further comprises:
providing a plurality of application programming interface drivers within the electronic communications interface, the plurality of application programming interface drivers including at least one driver for each of the one or more additional electronic system providers and the first electronic system provider;

providing a third-party code section within the electronic communications interface to allow communications with the third-party cloud; and providing a common procedures section within the electronic communications interface to allow communications between each of the plurality of application programming interface drivers and the third-party code section.

19. The processor-readable storage medium of claim 14 wherein the method further comprises collecting a premium service fee from each of one or more external users.

20. The processor-readable storage medium of claim 19 wherein the method further comprises:

intercepting a first set of communications streams between the one or more additional electronic system providers and the third-party cloud; and intercepting a second set of communications streams between each of the one or more external users and the third-party cloud.

21. The processor-readable storage medium of claim 14 wherein the method further comprises using the first and second sets of intercepted communications streams to provide market research.

* * * * *